J. A. McCOY.
CABLE TERMINAL BOX.
APPLICATION FILED MAR. 7, 1911.
1,174,078. Patented Mar. 7, 1916.
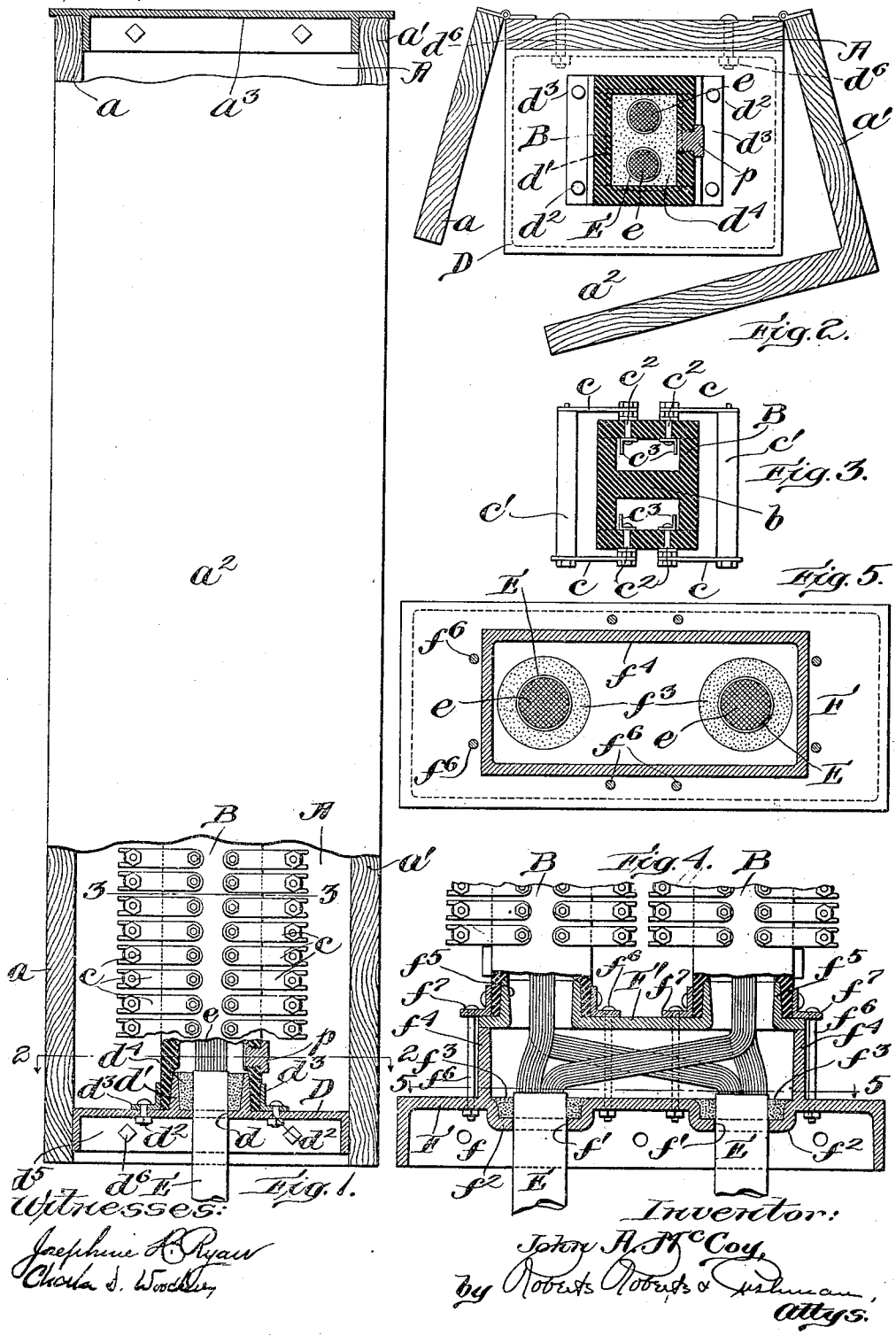

UNITED STATES PATENT OFFICE.

JOHN A. McCOY, OF SOMERVILLE, MASSACHUSETTS.

CABLE TERMINAL BOX.

1,174,078.  Specification of Letters Patent.  Patented Mar. 7, 1916.

Application filed March 7, 1911. Serial No. 612,824.

*To all whom it may concern:*

Be it known that I, JOHN A. McCOY, citizen of the United States, and resident of Somerville, in the county of Middlesex and State of Massachusetts, have invented new and useful Improvements in Cable Terminal Boxes, of which the following is a specification.

This invention relates to cable terminal-boxes, and consists in certain improvements, hereinafter more particularly described and pointed out in the claims, upon devices of the general character shown in Letters Patent No. 875,279, issued to me December 31, 1907.

In the accompanying drawings, which illustrate certain embodiments of my invention,—Figure 1 is a front elevation, partly broken away and partly in vertical section, of a cable terminal-box containing my invention; Fig. 2 is a cross sectional view on line 2—2 of Fig. 1, showing the outer casing partly open; Fig. 3 is a cross sectional view of the inner casing taken on a plane passing between the connecting arms, as on line 3—3 of Fig. 1; Fig. 4 is a front elevation, partly broken away and partly in vertical section, of the lower part of a cable terminal containing a modified form of the invention; and Fig. 5 is a cross section on line 5—5 of Fig. 4.

Referring first to Figs. 1, 2 and 3, the outer casing, or container casing, consists of the rear wall A, which may be secured in any suitable way to a pole or building, the side wall $a$, hinged to the rear wall, the side and front walls $a'$ and $a^2$, together constituting one part and hinged to the rear wall, and the flanged top plate or cover $a^3$, of metal, which is bolted through one of the flanges to the upper end of the rear wall A. Thus the top and rear walls may be rigidly secured together, and the side and front walls may be swung open like doors, as shown in Fig. 2, affording free access to the interior of the casing.

The inner distributing casing may be in general construction similar to that shown in my said patent No. 875,279. It consists of the hollow, elongated box B, preferably divided longitudinally into two compartments by a partition $b$, which terminates short of the lower end of the casing. Secured opposite to one another on the front and rear walls are the connecting arms $c$, between the outer ends of which are the conductors $c'$, preferably in the form of fuses. The inner ends of the arms $c$ are secured to bolts or posts $c^2$ which pass through the walls of the casing B, and are provided with clips $c^3$ in the interior of the casing, to which the wires from the cables are connected in the usual way.

D represents a bottom preferably of metal, common to both the outer container casing and the inner distributing casing. This metal bottom is provided with two cable apertures $d$, one for the underground cable and one for the overhead cable. Surrounding these apertures is the upwardly extending box flange $d'$, which forms a cell or pocket around the cable apertures. The lower end of the distributing casing B fits over the outside of said box flange, and in order to insure a tight joint between the flange and the casing, one or the other or both of the joint making members, but preferably the outer surface of the flange, is made tapered as best shown in Fig. 1. The joint is drawn tight together and the casing secured to the metal bottom over the flange, by bolts $d^2$ which pass through the bottom D and angle metal fastening strips $d^3$ secured to the lower end of casing B.

Each cable end consists of the end of sheath E and the projecting wires or conductors $e$. The cable end projects upward through the cable aperture $d$ in the metal bottom, and the wires or conductors $e$ are connected in the usual way to the clips $c^3$. The cable sheath E extends into the pocket formed by the box flange $d'$, and is sealed to and supported by the metal bottom by a sealing material such as metal $d^4$ melted and poured into the pocket surrounding the cable end and there permitted to harden. This metal seal $d^4$ performs the double office of uniting the metal bottom and the cable end, supporting the latter upon the former without the use of clamps, couplings or other supporting devices heretofore used, and sealing the joint between cable E and the metal bottom against moisture. The cable sheath is cut off at or near the top of the pocket, as shown in the drawings, and the wires $e$, usually covered with paper insulation, are connected in a well understood manner with clips $c^3$, the wires of the overhead cable being connected to one side of the distributing casing, and the wires of the underground cable with the other side; and each overhead wire is then electrically connected with an underground wire by a fuse $c'$.

After the wires are all properly connected up, and the cable end sealed to the metal bottom as described, an insulating material, while hot and liquid, such as melted paraffin, may be poured into the inner casing B, until the casing is filled, and all the wires and clips to which they are connected are embedded. During this operation a plug $p$, screwed into a hole in the lower part of casing B, holds the melted paraffin from escaping. The plug $p$ is then removed, while the paraffin is still liquid, and the paraffin is drawn off, leaving the interior of the casing, the joints, wires, contact clips, etc., coated with an insulating and moisture-proof material. By thus providing an outlet aperture and plug $p$, not only is it possible to save much in the quantity of the insulating compound used, but if it becomes necessary to repair or change any of the connections within the distributing casing, it can be done without disturbing the other connections and with much greater facility than if the insulating compound were left to harden, filling the entire casing.

It will be seen that the metal bottom D, the inner casing B, the cable end E, and the seal uniting it to the bottom, and all the electrical connections can be permanently assembled and set up as a unit, in a work shop or wherever convenient, independently of the outer casing, and then carried to the place where it is to be installed, and the unitary structure secured within the outer container casing, which may be already mounted on a pole, by bolting the downwardly extending flange $d^5$ on the metal bottom D to the rear wall A of the outer casing by means of bolts $d^6$. It will be understood that the cable terminal will be united with the main cable by the usual cable splice.

Referring now to the modification shown in Figs. 4 and 5, the metal bottom structure includes the lower plate F, made with the downwardly turned flange $f$ by which it is secured within the outer casing, and the two cable apertures $f'$ in the depressed or countersunk parts $f^2$ which form cells or pockets around the apertures. The cable ends E project through said apertures into said pockets, and are there supported and sealed by metal or other suitable sealing material $f^3$ poured into said pockets around the cable ends and hardened. A wall $f^4$ on the upper side of plate F surrounds both pockets, and on the top of wall $f^4$ is a cover plate $F'$, provided with two apertures over the cable apertures $f'$ respectively, and surrounded by upwardly extending box flanges $f^5$, similar to box flange $d'$, already described. In this form of the invention two inner casings B may be used side by side, and therefore twice as many pairs of wires may be used in a box of the same height, as in Figs. 1, 2 and 3.

It will be understood that one of the cables E is the underground cable and the other the overhead cable, and in order properly to distribute the wires, half of the wires of each cable will be carried into the distributing casing directly above the cable end, and the other half carried across, within walls $f^4$, to the other distributing casing, so that each distributing casing will contain the same number of incoming and outgoing wires. The casings B and the cover plate F' are clamped in position over the bottom F by bolts $f^6$ passing through the plate F and the angle metal clamping pieces $f^7$ fixed to the casings B. This structure may also be assembled as an unitary structure and thereafter set up in an outer casing.

I claim:

1. A cable terminal box comprising a metal bottom structure, a plurality of distributing casings mounted above said metal bottom structure, said metal bottom structure being made hollow to form an inclosed chamber, the lower wall of said chamber having a plurality of cable apertures therethrough and the upper wall of said chamber having a plurality of conductor apertures communicating with the interiors of the several distributing casings, and a number of cable ends extending upward through said cable apertures into said chamber, the wires of said cable ends being separated within said chamber into a plurality of groups extending through different apertures in the upper walls of the chamber to different distributing casings.

2. In a cable terminal-box, an outer container casing and an inner distributing casing, a bottom structure common to both casings, said bottom structure having a cable aperture communicating with the inner casing, a pocket surrounding said aperture, a cable end extending upward through said aperture and into said pocket, a seal in said pocket by which said cable end is united to and supported by said bottom structure.

Signed by me at Boston, Massachusetts, this 28th day of February, 1911.

JOHN A. McCOY.

Witnesses:
ROBERT CUSHMAN,
CHARLES D. WOODBERRY.